US008036639B2

(12) United States Patent
Carter et al.

(10) Patent No.: US 8,036,639 B2
(45) Date of Patent: *Oct. 11, 2011

(54) METHOD AND SYSTEM FOR CONFIRMING SECURE COMMUNICATION NETWORK SETUP IN A WIRELESS LOCAL AREA NETWORK (WLAN)

(75) Inventors: Edward Carter, Sunnyvale, CA (US);
Manoj Thawani, Sunnyvale, CA (US);
Manas Deb, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1511 days.

This patent is subject to a terminal disclaimer.

(21) Appl. No.: 11/208,310

(22) Filed: Aug. 18, 2005

(65) Prior Publication Data
US 2006/0039563 A1 Feb. 23, 2006

Related U.S. Application Data

(60) Provisional application No. 60/602,396, filed on Aug. 18, 2004, provisional application No. 60/671,120, filed on Apr. 14, 2005.

(51) Int. Cl.
*H04W 4/00* (2009.01)
(52) U.S. Cl. ........ 455/411; 455/410; 455/450; 380/270; 709/229; 709/230
(58) Field of Classification Search .................... 726/15; 370/235; 455/456.5, 456.6, 410, 411, 450; 342/464; 380/270; 709/229, 230
See application file for complete search history.

(56) References Cited

U.S. PATENT DOCUMENTS 7,421,503 B1 * 9/2008 Stieglitz et al. ............... 709/229
2004/0198319 A1 * 10/2004 Whelan et al. ................. 455/411
2004/0242197 A1 * 12/2004 Fontaine ....................... 455/411

OTHER PUBLICATIONS

Derek Cheung (i.e., Cheung), "WLAN Security & Wi-Fi Protected Access", Dr. Dobb's Journal, Jun. 1, 2004.*
IEEE Std 802.1X™—2004, "IEEE Standard for Local and metropolitan area networks: Port-Based Network Access Control", pp. 1-51, Dec. 13, 2004.
IEEE Std 802.11™, 2003 Edition, "Information technology-Telecommunications and information exchange between systems-Local and metropolitan area networks-Specific requirements—Part 11: Wireless LAN Medium Access Control (MAC) and Physical Layer (PHY) Specifications", pp. 9-65, Jun. 12, 2003.

* cited by examiner

*Primary Examiner* — Pierre-Louis Desir
(74) *Attorney, Agent, or Firm* — McAndrews, Held & Malloy, Ltd.

(57) ABSTRACT

In a communication network, a method and system for confirming secure communication network setup in a wireless local area network (WLAN) are provided. After a secure communication configuration is completed in a wireless network between a configurator station and a client station, a test exchange operation may be utilized during a configurator registration window to verify or validate the successful exchange of the SSID and passphrase to the client station. In this regard, the test exchange verifies the ability of the client station to connect to the corresponding WLAN. The test exchange may comprise an IEEE 802.11 or WLAN exchange phase, a Wi-Fi protected access (WPA) exchange phase, and a secure configuration protocol echo exchange phase. The WLAN and WPA exchanges may be utilized to enable a WPA joining of the client station while the secure configuration protocol echo exchange may be utilized to provide further authentication support.

15 Claims, 9 Drawing Sheets

METHOD AND SYSTEM FOR CONFIRMING SECURE COMMUNICATION NETWORK SETUP IN A WIRELESS LOCAL AREA NETWORK (WLAN)

CROSS-REFERENCE TO RELATED APPLICATIONS/INCORPORATION BY REFERENCE

This application makes reference to, claims priority to, and claims the benefit of: U.S. Provisional Application Ser. No. 60/602,396 filed Aug. 18, 2004; and U.S. Provisional Application Ser. No. 60/671,120 filed Apr. 14, 2005.

This application makes reference to:
U.S. application Ser. No. 11/207,302 filed Aug. 18, 2005;
U.S. application Ser. No. 11/207,262 filed Aug. 18, 2005;
U.S. application Ser. No. 11/207,658 filed Aug. 18, 2005;
U.S. application Ser. No. 11/208,081 filed Aug. 18, 2005;
U.S. application Ser. No. 11/208,275 filed Aug. 18, 2005;
U.S. application Ser. No. 11/208,346 filed Aug. 18, 2005;
U.S. application Ser. No. 11/207,661 filed Aug. 18, 2005;
U.S. application Ser. No. 11/207,301 filed Aug. 18, 2005;
U.S. application Ser. No. 11/208,284 filed Aug. 18, 2005; and
U.S. application Ser. No. 11/208,347 filed Aug. 18, 2005.

All of the above referenced applications are hereby incorporated herein by reference in their entirety.

FIELD OF THE INVENTION

Certain embodiments of the invention relate to wireless network communication. More specifically, certain embodiments of the invention relate to a method and system for confirming secure communication network setup in a wireless local area network (WLAN).

BACKGROUND OF THE INVENTION

Currently, with some conventional systems, setting up a wireless network generally requires significant interaction and technical knowledge on the part of a user setting up the network, especially when the user is configuring security options for the network. For computer savvy users, the tasks associated with setting up a wireless network can be time consuming. However, for inexperienced computer users, the tasks associated with setting up a wireless network can be more challenging and consumes significantly greater time than required by computer savvy users.

In general, 802.11-based networks require a significant amount of user interaction during the configuration process. Typically, with conventional 802.11-based networks, the user needs to configure a station (STA) to associate to an access point (AP), which may require a number of settings to be selected on the STA, and some knowledge of the default configuration of the AP. The user may then access an HTML-based menu on the new AP in order to set various configuration parameters, many of which are difficult for novice and for intermediate users to understand and set correctly. New APs generally start with a configuration that provides no network security, and which utilize a default network name or service set identifier (SSID) that is selected by the manufacturer such as, for example, "Manufacturer Name", "Default", or "wireless". With the proliferation of 802.11 networks, users often experience confusion and network problems when their new AP uses the same SSID as a neighboring AP. Mechanisms that simplify the tasks associated with the configuration process may reduce the time and/or the cost of setting up and/or expanding a wireless network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for confirming secure communication network setup in a wireless local area network (WLAN) substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
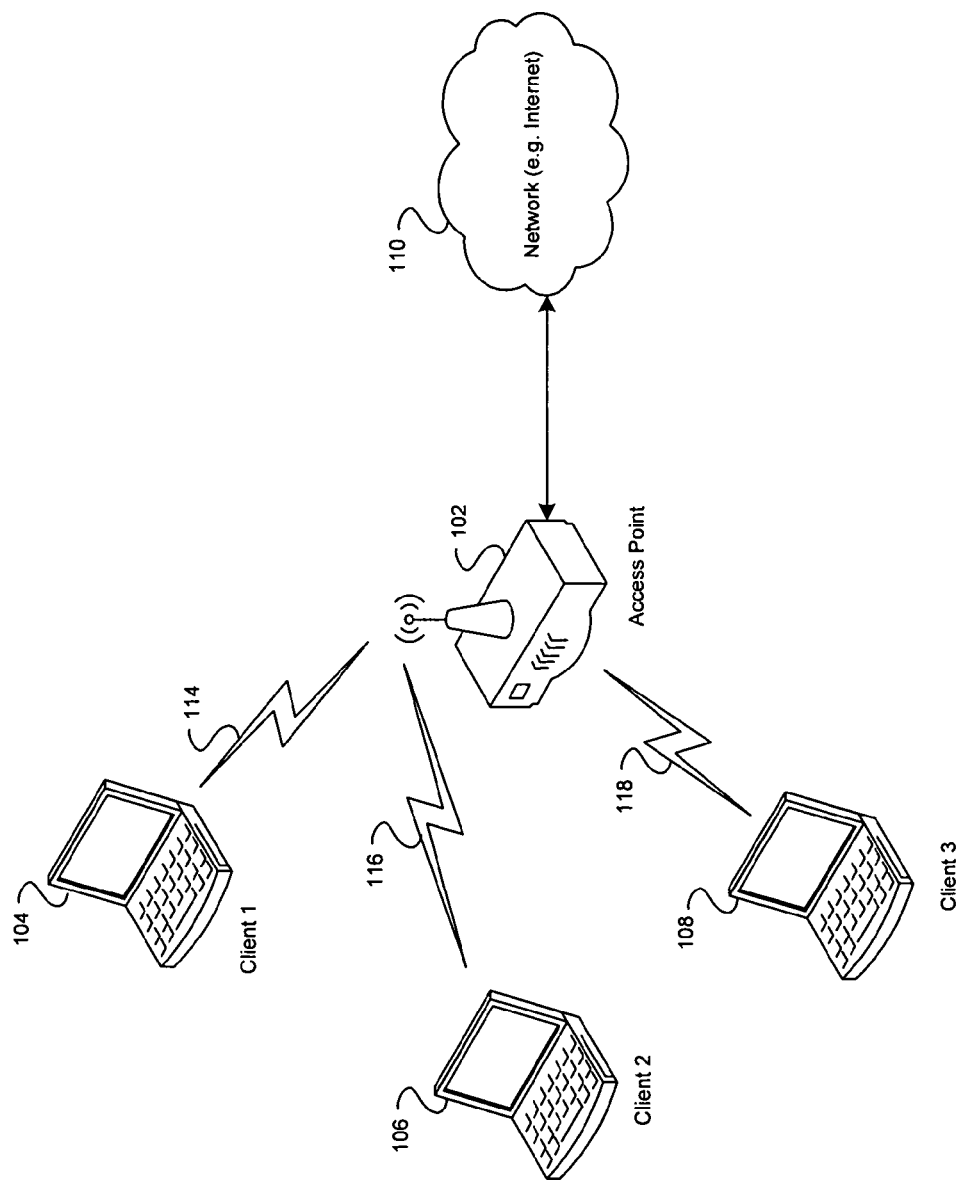
FIG. 1A is a block diagram of an exemplary wireless network, which may be utilized in connection with an embodiment of the invention.

Certain embodiments of the invention may be found in a method and system for confirming secure communication network setup in a wireless local area network (WLAN). After a secure communication configuration is completed in a wireless network between a configurator station and a client station, a test exchange operation may be utilized during a configurator registration window to verify or validate the successful exchange of configuration information with the client station. The configuration may comprise a default network name or service set identifier (SSID) and passphrase. In this regard, the test exchange verifies the ability of the client station to connect to the corresponding WLAN. The test exchange may comprise an IEEE 802.11 or WLAN exchange phase, a Wi-Fi protected access (WPA) exchange phase, and a secure configuration protocol echo exchange phase. The WLAN and WPA exchange phases may be utilized to enable a WPA joining of the client station while the secure configuration protocol echo exchange phase may be utilized to verify the successful setup of configuration. Secure configuration protocol packets may be encapsulated utilizing, for example, the extensible authentication protocol (EAP).

In IEEE 802.11 WLAN systems, wireless terminal devices, or wireless terminals, for example personal computers or personal digital assistants, may communicate via radio frequency (RF) channels that may be monitored by unauthorized parties at terminal devices that were not intended to participate in the communication. Components in a system, in accordance with an embodiment of the invention, may comprise a configurator, which may alternatively be referred to as a configurator terminal, configurator device, or configurator station, and a client, which may be alternatively referred to as a client terminal, client device, or client station. A configurator station, or a client station, may be referred to as a station.

The configurator may be a wireless and/or wired terminal device, an Ethernet switching device, or other device in an IEEE 802 local area network (LAN) and/or WLAN. The configurator may be located in an access point, for example. The configurator may provide a service to configure clients, which may be wireless terminal devices, thereby enabling the configured clients to utilize secure RF channels with little interaction required from the user. The client may be a wireless and/or wired terminal device, an Ethernet switching device, or other device in an IEEE 802 LAN and/or WLAN.

IEEE 802.11 provides specifications that enable wireless terminal devices to communicate utilizing encryption techniques. The utilization of encryption techniques to securely exchange information between wireless terminals may prevent unauthorized parties from determining the information content carried in communications via a secure RF channel. Prior to being enabled to utilize a WLAN, the wireless terminal device may be required to obtain authorization through a process that comprises authentication.

Authentication may comprise a process of steps that identify a user of a wireless terminal device. Enabling a user of a wireless terminal device to obtain authorization and to utilize encryption may require the user to manually configure the wireless terminal. The manual configuration, however, may require a user to possess a level of knowledge about the WLAN that may exceed that of a typical user.

FIG. 1A is a block diagram of an exemplary wireless network, which may be utilized in connection with an embodiment of the invention. Referring to FIG. 1A, there is shown an access point (AP) 102, and a plurality of client stations (STA) 104, 106, and 108, a plurality of RF channels 114, 116, and 118, and a network 110. In various embodiments of the invention, the access point 102 may also be referred to as a configurator or configurator station. The STAs 104, 106, and 108 may be wireless terminals. In various embodiments of the invention, the client stations 104, 106, and 108 may also be referred to as a client. The network 110 may be a private or public network, for example, the Internet. The configured STAs 104, 106, and 108 may communicate with the AP 102 via corresponding secure RF channels 114, 116, and 118. The AP 102 may communicate information received from a configured STA 104, 106, or 108 via the Internet 110. An unconfigured STA 104, 106, or 108 may communicate with the AP 102 functioning as a configurator to request configuration information. The AP 102 functioning as a configurator may configure a requesting STA 104, 106, or 108 via a corresponding RF channel 114, 116, or 118.

In general, the AP 102 may be adapted to facilitate the registration and/or authentication of client stations so that the client stations may become associated with the AP 102 in secure communications network. Various embodiments of the invention may comprise software that executes in the AP 102 and/or client station 104 in order to facilitate registration and/or authentication. The software may enable the AP 102 to register client stations 104 in a secure communications network. An AP 102 may register a client station 104 by storing information, for example a media access control (MAC) address or an Internet protocol (IP) address, associated with the client station 104. Registration may also comprise configuration of the client station 104 by the AP 102. The AP 102 may be adapted to function as an AP, and/or a configurator. In this regard, the AP 102 may comprise a configurator function and/or function as a configurator, may serve in a capacity as an AP and/or a configurator. In instances where the AP 102 functions or operates as a configurator, the AP 102 may be referred to as an AP 102 functioning as a configurator. In accordance with various embodiments of the invention, the AP 102 functioning as a configurator may comprise suitable logic, circuitry, and/or code that may be adapted to generate the WLAN exchange response message. An access point functioning as a configurator may be referred to as a configurator. The client station 104 may comprise suitable logic, circuitry, and/or code that may be adapted to generate the WLAN exchange request message. The WLAN exchange request message and the WLAN exchange response message may be utilized for confirming secure communication network setup.

An AP 102 may configure a client station 104 by performing software configuration tasks that enable the client station 104 to communicate information to another STA 106 in a secure communications network. In one embodiment of the invention, exemplary software configuration tasks may comprise generating a passphrase at an AP 102 and communicating the passphrase securely, to the client station 104. The passphrase may be utilized to encrypt information communicated by STAs in a secure communications network. The secure communications network may comprise the AP 102, and one or more client stations such as client station 104, that are configured by the AP 102. A system for secure automatic registration in a communications network may comprise an access point 102 that registers a client device 104 without requiring that software configuration tasks be performed by an end user. In this regard, an end user does not have to manually enter configuration information on the AP 102 and/or the client station 104 in order to register and authenticate the client station 104.

In various embodiments of the invention, activating a hardware button and/or software button may register a client station 104 with an AP 102. This may comprise activating a hardware and/or software enabled button located on an AP 102, and by activating a hardware and/or software enabled button located on a client station 104. A hardware button may comprise a physical button that may be dedicated to performing a function related to automatic registration security. A software enabled button may comprise a software icon that appears on a user interface. A hardware button and/or software enabled button may be activated as a result of a method of physical action on the part of a user. Activation of a hardware and/or software enabled button located on an AP 102, and subsequent activation of a hardware and/or software enabled button located on a client station 104, may result in a registering of the client station 104 with the AP 102. The client station 104 may also be configured, by the AP 102, to communicate information in a secure communications network.

Some IEEE 802.11 WLANs utilize a technology for network security based on Wi-Fi protected access (WPA), or second generation WPA (WPA2). For example, configuration parameters, such as a passphrase or SSID, may require manual entry by a user at an AP 102 and/or at a client station 104 in some conventional WPA-based WLANs. In various embodiments of the invention, in order to provide support for WPA, the passphrase and/or SSID may be generated by an AP 102, and entered at a client station 104, by activating a hardware and/or software enabled button located on an AP 102, and/or located on a client station 104. Subsequent to configuration, in accordance with various embodiments of the invention, the configured client station 104 may communicate information in a WPA-based WLAN. A client station 104, which is configured with a passphrase and/or SSID in accordance with various embodiments of the invention, may communicate in a secure communication network with a WLAN station 106, for which the passphrase and/or SSID were not configured in accordance with various embodiments of the invention. For example, the passphrase and SSID may be configured at the WLAN station 106 as a result of manual entry by a user.

Figure 1B:
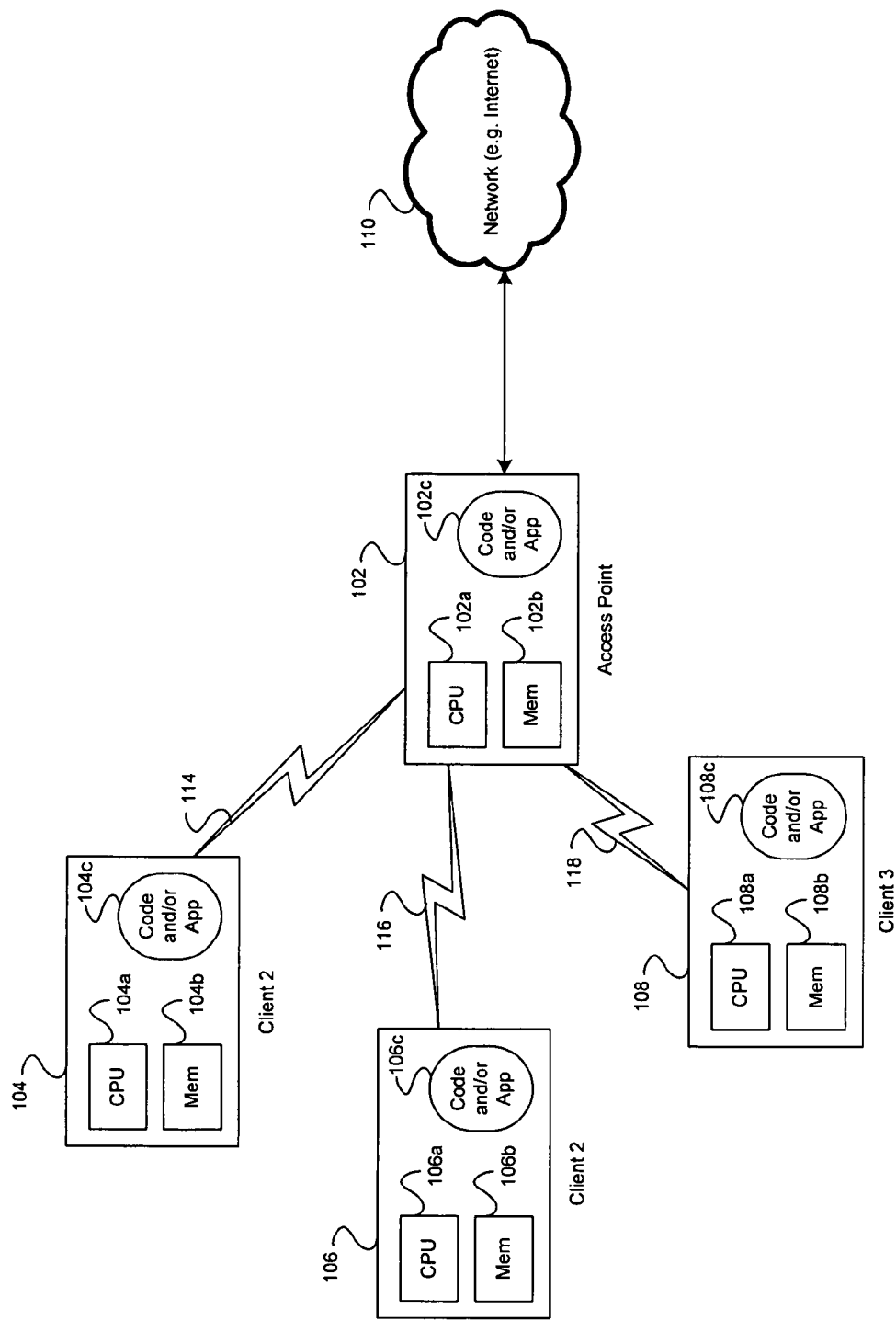
FIG. 1B is a block diagram of a software environment in an exemplary wireless network, which may be utilized in connection with an embodiment of the invention.

FIG. 1B is a block diagram of a software environment in an exemplary wireless network, which may be utilized in connection with an embodiment of the invention. Referring to FIG. 1B, there is shown an access point (AP) 102, and a plurality of client stations (STA) 104, 106, and 108, a plurality of RF channels 114, 116, and 118, and a network 110. The AP 102 may further comprise a central processing unit (CPU) 102*a*, system memory 102*b*, and code and/or application software 102*c*. The STA 104 may further comprise a CPU 104*a*, system memory 104*b*, and code and/or application software 104*c*. The STA 106 may further comprise a CPU 106*a*, system memory 106*b*, and code and/or application software 106*c*. The STA 108 may further comprise a CPU 108*a*, system memory 108*b*, and code and/or application software 108*c*. The AP 102, and the STAs 104, 106 and 108 may be substantially as described in FIG. 1A.

The CPU 102*a*, 104*a*, 106*a* or 108*a* may be adapted to perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The system memory 102*b*, 104*b*, 106*b* or 108*b* may comprise suitable logic, circuitry, and/or code to be utilized to store, or write, and retrieve, or read, information. It may comprise a plurality of memory technologies such as random access memory (RAM). The code and/or application software 102*c*, 104*c*, 106*c* or 108*c* may comprise a computer program.

In operation, the system memory 102*b* may comprise machine-readable storage having stored thereon at least one code section for enabling communication of information in a secure communication system. The at least one code section may be executable by the CPU 102*a*. The at least one code section may cause the CPU 102*a* to perform steps related to registering and configuring a client station 104 with the AP 102.

In operation, the system memory 104*b*, 106*b* or 108*b* may comprise machine readable storage having stored thereon at least one code section for enabling communication of information in a secure communication system. The at least one code section may be executable by the CPU 104*a*, 106*a* or 108*a*, respectively. The at least one code section may cause the CPU 104*a*, 106*a* or 108*a* to perform steps related to requesting registration and configuration of the client station 104, 106 or 108 with the AP 102.

Figure 2:
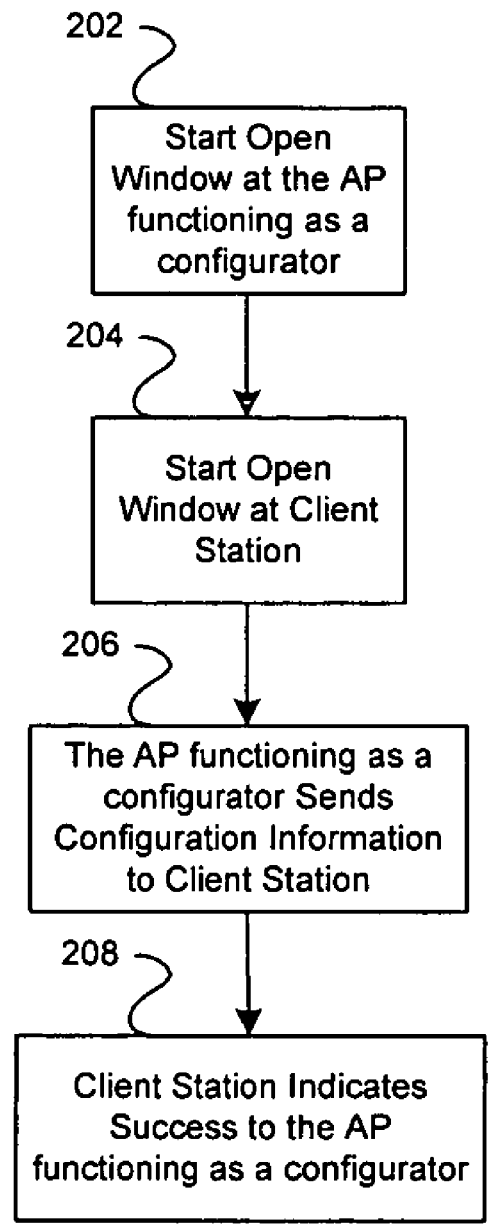
FIG. 2 is a flowchart illustrating exemplary steps performed during configuration of a client station, which may be utilized in connection with an embodiment of the invention.

FIG. 2 is a flowchart illustrating exemplary steps performed during configuration of a client station, which may be utilized in connection with an embodiment of the invention. FIG. 2 presents an exemplary overview of a process that may be utilized by an AP 102 functioning as a configurator to configure a STA 104. In step 202, a configurator registration window may be opened by activating a button at the AP 102 functioning as a configurator. The configurator registration window may comprise a time interval during which a client station 104 may obtain configuration services from the AP 102 functioning as a configurator. In step 204, a client window may be opened by activating a button at the client station 104. The client window may comprise a time interval during which a client station 104 may attempt to obtain configuration services from the AP 102 functioning as a configurator. In step 206, the AP 102 functioning as a configurator may send configuration information to the client station 104. In step 208, the client station 104 may indicate successful configuration to the AP 102 functioning as a configurator.

Figure 3A:
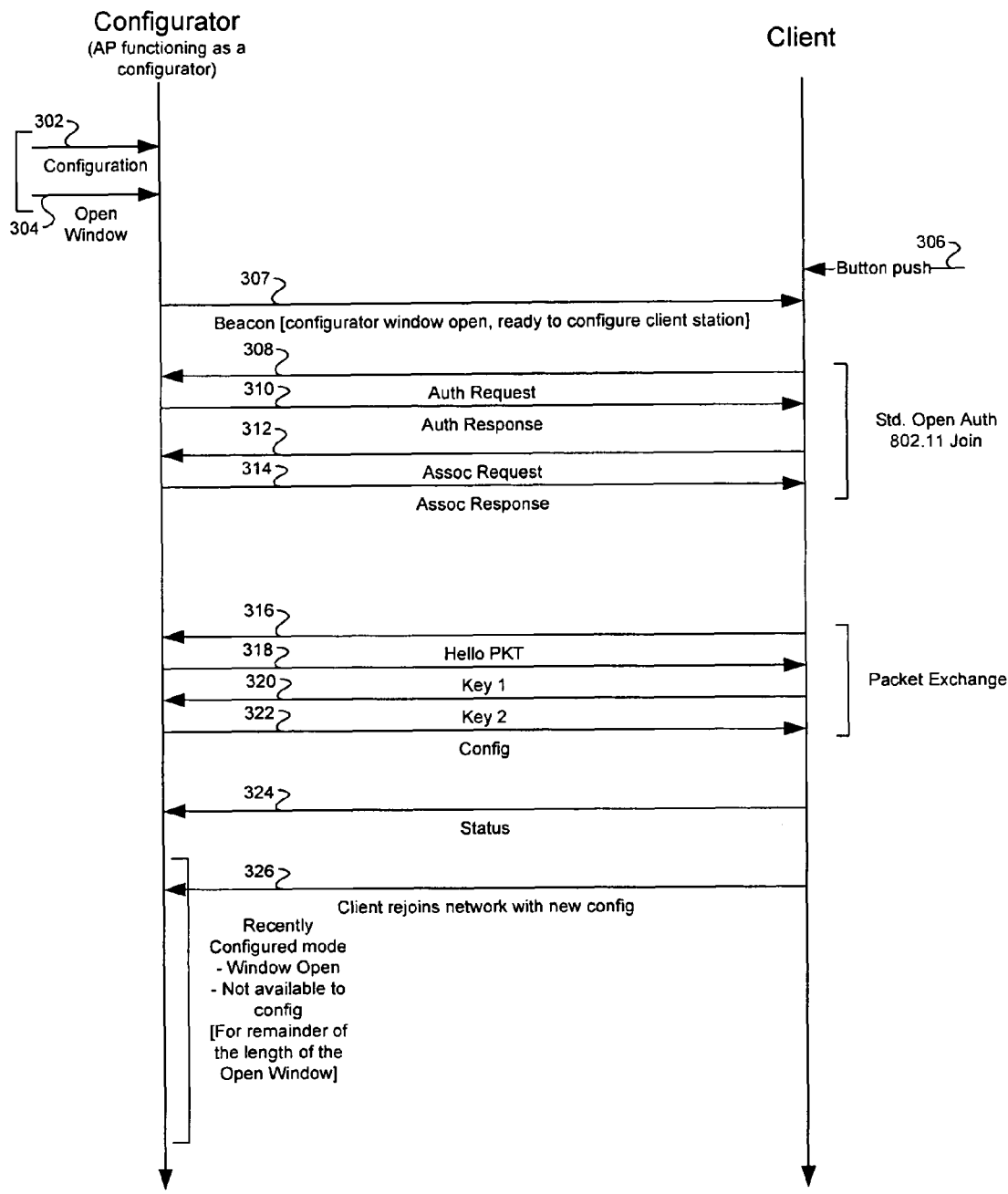
FIG. 3A is a diagram illustrating exemplary message exchanges based on a secure configuration protocol, which may be utilized in connection with an embodiment of the invention.

FIG. 3A is a diagram illustrating exemplary message exchanges based on a secure configuration protocol, which may be utilized in connection with an embodiment of the invention. FIG. 3A presents an exemplary exchange of messages between the AP 102 functioning as a configurator, and the client station 104, based on the protocol. In step 302, the configurator 104 may be configured. The information configured in step 302 may be subsequently utilized by the AP 102 functioning as a configurator, to configure client stations 104. In step 304, a configurator registration window may be opened at the AP 102 functioning as a configurator. This process may be substantially as described for step 202 in which opening of the configurator registration window is initiated at the AP 102 functioning as a configurator. In step 306, a window may be opened at the client station 104. This process may be substantially as described in step 204 in which opening of the client window at the client station 104 is started. In step 307, the AP 102 functioning as a configurator may transmit IEEE 802.11 beacon frames comprising authentication enablement information, in accordance with an embodiment of the invention. The authentication enablement information may indicate that the configurator registration window is open and that the AP 102 functioning as a configurator is ready to configure a client station 104. The access point functioning as a configurator may be referred to as a configurator.

Steps 308, 310, 312, and 314 may comprise message exchanges based on IEEE 802.11 comprising an open authentication and join of a basic service set (BSS) as defined in IEEE 802.11. In step 308, an authentication request message may be sent by the client station 104, to the AP 102 functioning as a configurator. In step 310, the AP 102 functioning as a configurator may send an authentication response message to the client station 104. In step 312, the client station 104 may send an association request message 312 to the AP 102 functioning as a configurator. In step 314, the AP 102 functioning as a configurator may send an association response message 314 to the client station 104.

Steps 316, 318, 320, and 322 may comprise a packet exchange based on the protocol. In step 316, the client station 104 may communicate a hello packet to the AP 102 functioning as a configurator. The hello packet 316 may indicate to the AP 102 functioning as a configurator that the client station 104 is ready to be configured. In step 318, the AP 102 functioning as a configurator may communicate a key1 message to the client station 104. The key1 message 318 may comprise a configurator key. In step 320, the client station 104 may communicate a key2 message to the AP 102 functioning as a configurator. The key2 message 320 may comprise a client key.

In step 322, the AP 102 functioning as a configurator may communicate a configuration message to the client station 104. The configuration message 322 may comprise configuration information that may be utilized to authenticate a client station 104. The configuration information communicated in the configuration message 322 may be encrypted based on the configurator key and/or the client key. In step 324, the client station 104 may communicate a status message to the AP 102 functioning as a configurator. The status message 324 may be sent subsequent to decryption of at least a portion of the configuration message 322. The client station 104 may utilize the configurator key and/or the client key to decrypt at least a portion of the configuration message 322 that was previously encrypted by the AP 102 functioning as a configurator. The status message 324 may indicate whether the client station 104 was successfully configured during the packet exchange. In step 326, the client station 104 may rejoin the WLAN based on the received configuration information. The steps performed during the rejoin 326 may be as defined in IEEE 802.11. The rejoin may occur via a secure RF channel that utilizes the received configuration information in step 322. Subsequent to configuration of the client station 104, the AP 102 functioning as a configurator may not be available to configure another client station 106 during the current configurator registration window time interval.

Figure 3B:
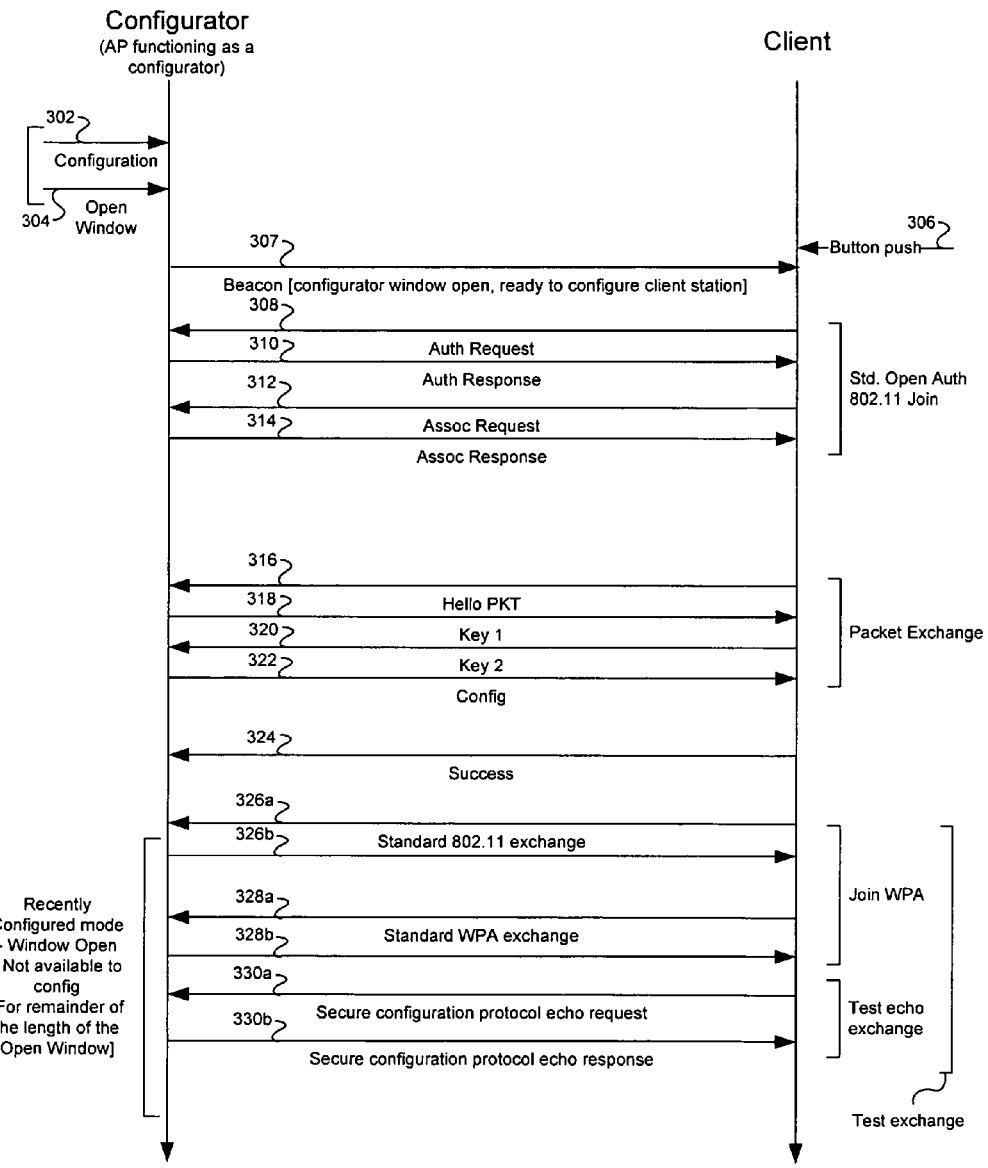
FIG. 3B is a diagram illustrating exemplary message exchanges comprising a test exchange based on a secure configuration protocol, which may be utilized in connection with an embodiment of the invention.

FIG. 3B is a diagram illustrating exemplary message exchanges comprising a test exchange based on a secure configuration protocol, which may be utilized in connection with an embodiment of the invention. Referring to FIG. 3B, after the packet exchange described in FIG. 3A occurs, there may be additional message exchanges to test or verify that a secure communication between a corresponding WLAN and the client station 104 has been established. In this regard, steps 302 through 324 in FIG. 3B may be substantially similar to steps 302 through 324 in FIG. 3A.

After step 324, steps 326a and 326b may comprise message exchanges based on IEEE 802.11 that may be utilized to enable the client station 104 to join a WLAN utilizing Wi-Fi protected access (WPA). Step 326a may correspond to a request by the client station 104 to the AP 102 functioning as a configurator while step 326b may correspond to a response from the AP 102 functioning as a configurator to the client station 104. The WPA is a Wi-Fi standard that extends the security features of wired equivalent privacy (WEP), a security protocol for WLAN systems defined in the IEEE 802.11b standard. The WPA standard may be utilized with Wi-Fi devices that have been enabled with WEP and provides improvements in data encryption through the temporal key integrity protocol (TKIP) and user authentication support through the extensible authentication protocol (EAP). The request and response 326a and 326b, respectively, may correspond to a WLAN exchange phase of the test exchange operation.

Steps 328a and 328b may comprise message exchanges based on the WPA standard. Step 328a may correspond to a request initiated by the client station 104 to the AP 102 functioning as a configurator while step 328b may correspond to a response from the AP 102 functioning as a configurator to the client station 104. Steps 328a and 328b may correspond to a WPA exchange phase of the test exchange operation. In this regard, the WLAN exchange phase and the WPA exchange phase, that is, steps 326a through 328b, may correspond to the message exchanges that may be utilized to join the client station 104 with the WLAN utilizing the WPA standard.

Steps 330a and 330b may comprise message exchanges based on the secure configuration protocol. Step 330a may correspond to a secure configuration protocol echo request initiated by the client station 104 to the AP 102 functioning as a configurator while step 330b may correspond to a secure configuration protocol echo response initiated by the AP 102 functioning as a configurator, which is destined for the client station 104. Steps 330a and 330b may correspond to a secure configuration protocol echo exchange phase of the test exchange operation. The secure configuration protocol packets may be encapsulated as EAP packets. The IEEE 802.11 standard specifies how to encapsulate EAP into local area networks (LAN) frames. If the client station 104 does not receive a secure configuration protocol echo response packet, the client station 104 may dissociate from the collocated device 102 functioning as an AP. The client station 104 may discard configuration information received based on the secure configuration protocol. The client station may revert to a configuration that existed prior to the start of the secure configuration protocol. Subsequent to configuration of the client station 104, the AP 102 functioning as a configurator may not be available to configure another client station 106 during the current configurator registration window time interval.

Figure 4:
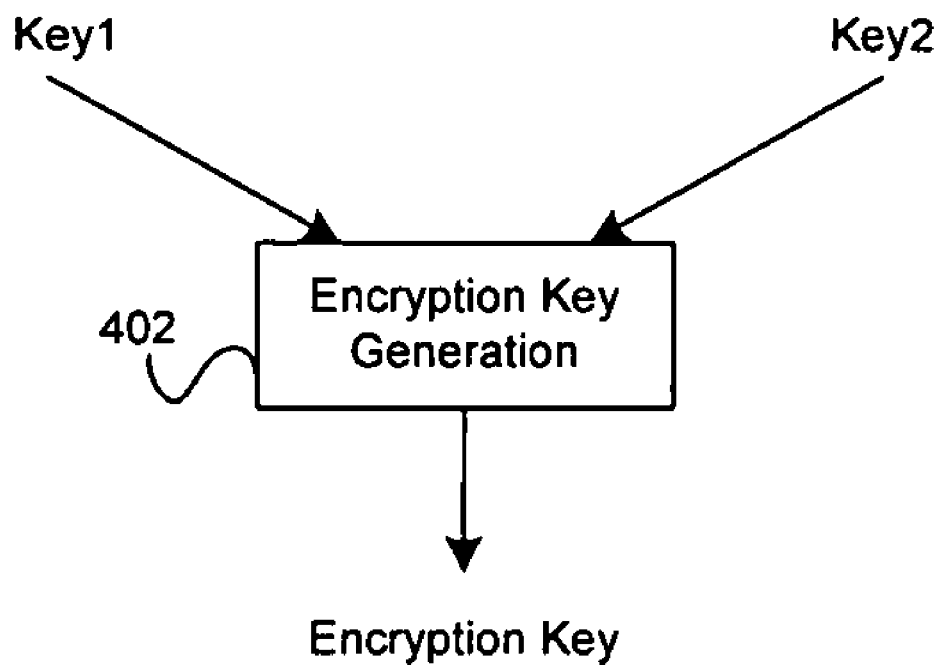
FIG. 4 is a block diagram illustrating exemplary encryption key generation based on keys, which may be utilized in connection with an embodiment of the invention.

FIG. 4 is a block diagram illustrating exemplary encryption key generation based on keys, which may be utilized in connection with an embodiment of the invention. Referring to FIG. 4, there is shown an encryption key generation block 402. The encryption key generation block 402 may utilize a key1, for example a configurator key received in a key1 message 318, and/or a key2, for example, a client key received in a key2 message 320, to generate an encryption key. The encryption key may be utilized to encrypt configuration information that is communicated in a configuration message 322, by an AP 102 functioning as a configurator to a client station 104.

Figure 5:
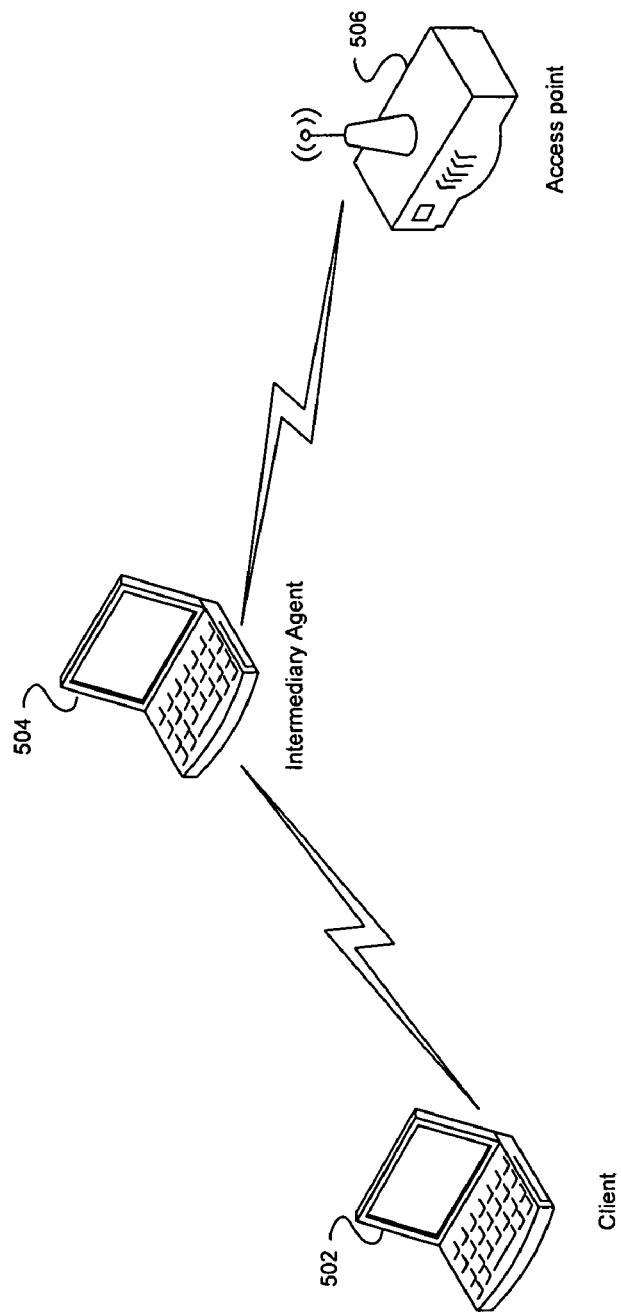
FIG. 5 is diagram illustrating an exemplary intermediary agent attack during authentication, which may occur in connection with an embodiment of the invention.

FIG. 5 is diagram illustrating an exemplary intermediary agent attack during authentication, which may occur in connection with an embodiment of the invention. Referring to FIG. 5, there is shown a client station 502, an intermediary agent 504, and an AP 506. The AP 506 may be utilized as a configurator. FIG. 5 illustrates an exemplary scenario in which a user intends to configure the client station 502 by communicating with the configurator 506, and subsequently exchanging messages, in accordance with the protocol as illustrated in FIGS. 3A and 3B. However, an intermediary agent 504 such as a hacker or unauthorized user may attempt to intercept messages sent by the client station 502, and block their reception at the configurator 506 via an RF channel. The protocol as illustrated in FIGS. 3A and 3B may be utilized to reduce the ability of the intermediary agent 504 to gain authentication from the configurator 506 and subsequently gain unauthorized access to the WLAN.

Figure 6:
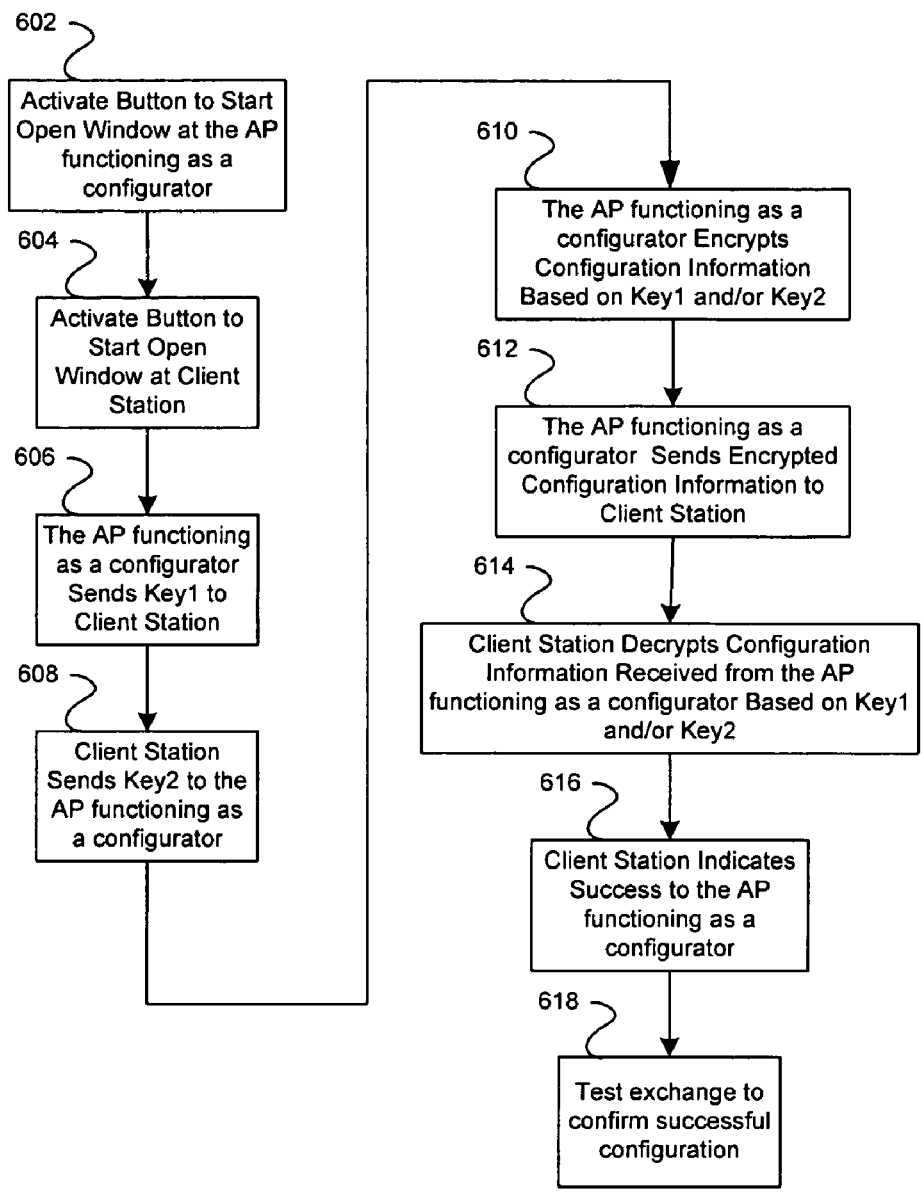
FIG. 6 is a flowchart illustrating exemplary steps for improved authentication for communications network setup that utilizes a confirmation button activation, in accordance with an embodiment of the invention.

FIG. 6 is a flowchart illustrating exemplary steps for improved authentication for communications network setup that utilizes a confirmation button activation, in accordance with an embodiment of the invention. The flowchart of FIG. 6 may follow the exchange of messages between a client station 104 and an AP 102 functioning as a configurator, in accordance with the protocol as illustrated in FIG. 3. In step 602, a button may be activated at the AP 102 functioning as a configurator that opens a registration window. Step 602 may be substantially as described in step 202 in which opening of the configurator registration window is started at the AP 102 functioning as a configurator. In step 604, a button may be activated at the client station 104 that opens a client window. The client window may be substantially as described in step 204 in which opening of the client window is started at the client station 104. A button at either the AP 102 functioning as a configurator, or the client station 104, may be a hardware button, or a software button, for example a software button that is displayed in a user interface.

In step 606, the AP 102 functioning as a configurator may send a key1 to the client station 104. The key1 may comprise a configurator key that is sent in a key1 message 318, for example. In step 608, the client station 104 may send a key2 to the AP 102 functioning as a configurator. The key2 may comprise a client key that is sent in a key2 message 320, for example. In step 610, the AP 102 functioning as a configurator may utilize the key1 and/or key2 to generate an encryption key that is subsequently utilized to encrypt configuration information. Step 610 may occur after the AP 102 functioning as a configurator has received a key2 message. In step 612, the AP 102 functioning as a configurator may send the encrypted configuration information to the client station 104. The encrypted configuration information may be sent in a configuration message 322, for example. In step 614, the client station 104 may use the key1 and/or key2 to generate a decryption key that is subsequently utilized to decrypt the encrypted configuration information. In step 616, the client station 104 may indicate successful configuration status to the AP 102 functioning as a configurator. Step 616 may be substantially as described in step 208 in FIG. 2 in which the client station 104 indicates successful configuration to the AP 102 functioning as a configurator. The indication of successful configuration may be sent in a success message 324 as shown in FIG. 3A, for example. In step 618, the client station 104 may initiate a test exchange to confirm or verify that the client station 104 has access to the corresponding WLAN. In this regard, the test exchange may comprise the WLAN exchange phase, the WPA exchange phase, and the secure configuration protocol echo exchange phase as described in FIG. 3B.

Figure 7:
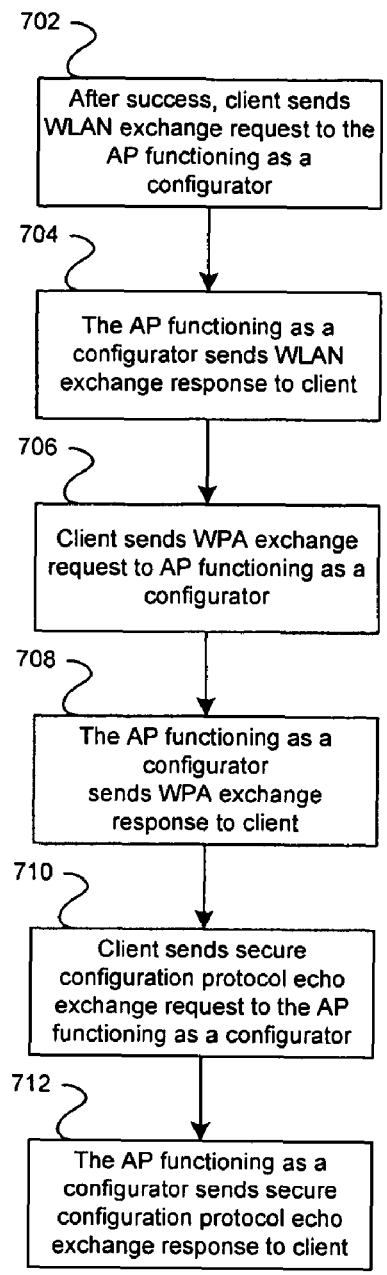
FIG. 7 is a flowchart illustrating exemplary steps for confirming a secure communication setup when utilizing a secure configuration protocol, in accordance with an embodiment of the invention.

FIG. 7 is a flowchart illustrating exemplary steps for confirming a secure communication setup when utilizing a secure configuration protocol, in accordance with an embodiment of the invention. Referring to FIG. 7, in step 702, after a client station 104 sends a success message to the AP 102 functioning as a configurator, the client station 104 may initiate the WLAN exchange phase of the test exchange by sending at least one signal that corresponds to a WLAN exchange request message to the AP 102 functioning as a configurator. In step 704, the AP 102 functioning as a configurator may send to the client station 104 at least one signal that corresponds to a WLAN exchange response message to the WLAN exchange request message received from the client station 104.

In step 706, the client station 104 may initiate the WPA exchange phase of the test exchange by sending at least one signal that corresponds to a WPA exchange request message to the AP 102 functioning as a configurator. In this regard, the client station 104 may also be adapted to generate the WPA exchange request message. In step 708, the AP 102 functioning as a configurator may send to the client station 104, at least one signal that corresponds to a WPA exchange response message to the WPA exchange request message received from the client station 104. In this regard, the AP 102 functioning as a configurator may also be adapted to generate the WPA exchange response message.

In step 710, the client station 104 may initiate the secure configuration protocol echo exchange phase of the test exchange by sending at least one signal that corresponds to a secure configuration protocol echo exchange request message to the AP 102 functioning as a configurator. In this regard, the client station 104 may also be adapted to generate the secure configuration protocol echo exchange request message. In step 712, the AP 102 functioning as a configurator may send to the client station 104 at least one signal that corresponds to an secure configuration protocol echo exchange response message to the secure configuration protocol echo exchange request message received from the client station 104. In this regard, the AP 102 functioning as a configurator may also be adapted to generate the secure configuration protocol echo exchange response message.

Another embodiment of the invention may provide a machine-readable storage, having stored thereon, a computer program having at least one code section executable by a machine, thereby causing the machine to perform the steps as described above for confirming that a secure communication network setup has been established between a client station and a WLAN.

Aspects of various embodiments of the invention may be combined. For example, a user may select a configurator seed number $N_a$ that may be entered at the AP 102 functioning as a configurator and at the client station 104. The user may also select a pattern of button activations at a client station 104 that may be entered at the client station 104 and at the AP 102 functioning as a configurator. The AP 102 functioning as a configurator may generate an encryption key based on the configurator seed number and/or the pattern of button activations selected by the user at the client station 104. The client station 104 may generate a decryption key based on the configurator seed number and/or the pattern of button activations selected by the user at the client station 104.

Similarly, the user may select a client seed number $N_b$ that may be entered at the client station 104 and at the AP 102 functioning as a configurator. The user may also select a pattern of button activations at the AP 102 functioning as a configurator that may be entered at the AP 102 functioning as a configurator and at the client station 104. The AP 102 functioning as a configurator may generate an encryption key based on the client seed number and/or the pattern of button activations selected by the user at the AP 102 functioning as a configurator. The client station 104 may generate a decryption key based on the client seed number and/or the pattern of button activations selected by the user at the AP 102 functioning as a configurator.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling communication of information in a secure communication system, the method comprising:
   verifying by a client station, a secure wireless communication between said client station and a configurator station during a test exchange portion of a configurator registration window, wherein said test exchange portion comprises a wireless local area network (WLAN) exchange phase, a Wi-Fi protected access (WPA) exchange phase, and a secure configuration protocol echo exchange phase.

2. The method according to claim 1, comprising configuring said client station for secure wireless communication with said configurator station during said configurator registration window.

3. The method according to claim 1, comprising generating one or more signals during said WLAN exchange phase, wherein said generated one or more signals comprises a WLAN authentication request from said client station to said configurator station.

4. The method according to claim 1, comprising generating one or more signals during said WLAN exchange phase, wherein said generated one or more signals comprises a WLAN authentication response from said configurator station to said client station.

5. The method according to claim 1, comprising generating one or more signals during said WPA exchange phase, wherein said generated one or more signals comprises a WPA authentication request from said client station to said configurator station.

6. The method according to claim 1, comprising generating one or more signals during said WPA exchange phase, wherein said generated one or more signals comprises a WPA authentication response from said configurator station to said client station.

7. The method according to claim 1, comprising generating one or more encrypted signals during said secure configuration protocol echo exchange phase between said configurator station and said client station, wherein said secure configuration protocol echo exchange phase occurs after said WPA exchange phase.

8. The method according to claim 7, wherein said generated one or more encrypted signals during said secure configuration protocol echo exchange phase comprises an encrypted secure configuration protocol authentication request from said client station to said configurator station.

9. The method according to claim 7, wherein said generated one or more encrypted signals during said secure configuration protocol echo exchange phase comprises an encrypted secure configuration protocol authentication response from said configurator station to said client station.

10. A non-transitory machine-readable storage medium having stored thereon, a computer program having at least one code section for enabling communication of information in a secure communication system, the at least one code section being executable by a machine for causing the machine to perform steps comprising:
    verifying a secure wireless communication between a client station and a configurator station during a test exchange portion of a configurator registration window, wherein said test exchange portion comprises a wireless local area network (WLAN) exchange phase, a Wi-Fi protected access (WPA) exchange phase, and a secure configuration protocol echo exchange phase.

11. The non-transitory machine-readable storage medium according to claim 10, wherein said at least one code section comprises code for generating one or more encrypted signals during said secure configuration protocol echo exchange phase between said configurator station and said client station, wherein said secure configuration protocol echo exchange phase occurs after said WPA exchange phase.

12. A system for enabling communication of information in a secure communication system, the system comprising:
    a client station that is operable to verify a secure wireless communication between said client station and a configurator station during a test exchange portion of a configurator registration window, wherein said test exchange portion comprises a wireless local area network (WLAN) exchange phase, a Wi-Fi protected access (WPA) exchange phase, and a secure configuration protocol echo exchange phase.

13. The system according to claim 12, wherein said configurator station is operable to configure said client station for secure wireless communication with said configurator station during said configurator registration window.

14. The system according to claim 12, wherein said client station is operable to generate one or more encrypted signals during said secure configuration protocol echo exchange phase between said configurator station and said client station, wherein said secure configuration protocol echo exchange phase occurs after said WPA exchange phase.

15. The system according to claim 12, wherein said client station is operable to generate one or more signals during said WPA exchange phase between said configurator station and said client station, wherein said WPA exchange phase occurs after said WLAN exchange phase.

* * * * *